(12) United States Patent
Prestayko et al.

(10) Patent No.: US 10,796,813 B2
(45) Date of Patent: *Oct. 6, 2020

(54) CONDUCTIVE POLYMER COMPOSITE

(71) Applicant: XEROX CORPORATION, Norwalk, CT (US)

(72) Inventors: Rachel Prestayko, Hamilton (CA); Sarah J. Vella, Milton (CA); Carolyn Moorlag, Mississauga (CA); Barkev Keoshkerian, Thornhill (CA)

(73) Assignee: XEROX CORPORATION, Norwalk, CT (US)

( * ) Notice: Subject to any disclaimer, the term of this patent is extended or adjusted under 35 U.S.C. 154(b) by 442 days.

This patent is subject to a terminal disclaimer.

(21) Appl. No.: 15/044,456

(22) Filed: Feb. 16, 2016

(65) Prior Publication Data
US 2017/0236613 A1    Aug. 17, 2017

(51) Int. Cl.
H01B 1/24       (2006.01)
B29C 64/118     (2017.01)
B29C 64/141     (2017.01)
C08K 3/04       (2006.01)
B33Y 10/00      (2015.01)
B33Y 70/00      (2020.01)
C08K 3/08       (2006.01)
B29K 101/12     (2006.01)
B29K 105/16     (2006.01)

(52) U.S. Cl.
CPC ............. H01B 1/24 (2013.01); B29C 64/118 (2017.08); B29C 64/141 (2017.08); B33Y 10/00 (2014.12); B33Y 70/00 (2014.12); C08K 3/04 (2013.01); C08K 3/041 (2017.05); C08K 3/08 (2013.01); B29K 2101/12 (2013.01); B29K 2105/162 (2013.01); B29K 2105/167 (2013.01); C08K 2003/085 (2013.01); C08K 2003/0806 (2013.01); C08K 2003/0837 (2013.01); C08K 2003/0887 (2013.01)

(58) Field of Classification Search
None
See application file for complete search history.

(56) References Cited

U.S. PATENT DOCUMENTS

| 4,769,177 A | 9/1988 | Hocker et al. |
| 5,789,680 A | 8/1998 | Fujimoto |
| 6,331,586 B1 * | 12/2001 | Thielen .................. C08L 23/06 524/401 |
| 7,925,454 B1 | 4/2011 | Narcus |
| 8,865,604 B2 | 10/2014 | Wasynczuk |
| 2003/0234074 A1 * | 12/2003 | Bhagwagar ................ C09J 5/06 156/325 |
| 2004/0016912 A1 | 1/2004 | Bandyopadhyay et al. |
| 2009/0227162 A1 | 9/2009 | Kruckenberg et al. |
| 2011/0028678 A1 | 2/2011 | Matsuzono et al. |
| 2011/0260116 A1 | 10/2011 | Plee et al. |
| 2012/0024353 A1 | 2/2012 | Ge et al. |
| 2012/0247808 A1 | 10/2012 | Lam |
| 2014/0341518 A1 | 11/2014 | Kimura et al. |
| 2015/0123043 A1 | 5/2015 | Nagamune et al. |
| 2016/0012935 A1 | 1/2016 | Rothfuss |
| 2016/0198576 A1 | 7/2016 | Lewis et al. |
| 2017/0129170 A1 | 5/2017 | Kim et al. |
| 2017/0129182 A1 | 5/2017 | Sauti et al. |
| 2017/0151704 A1 | 6/2017 | Go et al. |
| 2017/0206999 A1 | 7/2017 | Prestayko et al. |
| 2017/0207000 A1 | 7/2017 | Prestayko et al. |
| 2017/0207001 A1 | 7/2017 | Vella et al. |
| 2017/0267532 A1 | 9/2017 | Liu |
| 2017/0284876 A1 | 10/2017 | Moorlag et al. |
| 2017/0297262 A1 | 10/2017 | Grigorian |
| 2017/0346129 A1 | 11/2017 | Stolyarov et al. |
| 2018/0049655 A1 | 2/2018 | Melnykowycz et al. |

FOREIGN PATENT DOCUMENTS

CA    2915409 A1   12/2014
EP    2 489 442 A1   8/2012

OTHER PUBLICATIONS

Chun et al., "High Conductive, Printable and Stretchable Composite Films of Carbon Nanotubes and Silver," Nature Nanotechnology, vol. 5, 2010, 853-857.
Office Action dated Mar. 2, 2018 from corresponding Canadian Application No. 2,957,114.
Prestayko et al., "Conductive Polymer Composite," U.S. Appl. No. 15/000,588, filed Feb. 16, 2016.
Prestayko et al., "Conductive Polymer Composite," U.S. Appl. No. 15/000,554, filed Jan. 19, 2016.
Moorlag et al., "3D Conductive Compositions Anticipating or Indicating Structural Compromise," U.S. Appl. No. 15/090,259, filed Apr. 4, 2016.

* cited by examiner

Primary Examiner — Robert T Butcher
(74) Attorney, Agent, or Firm — MH2 Technology Law Group LLP

(57) ABSTRACT

A conductive polymer composite includes: a thermoplastic polymer; a plurality of carbon nanotubes; and a plurality of metallic particulates in an amount ranging from about 0.5% to about 80% by weight relative to the total weight of the conductive polymer composite.

19 Claims, 4 Drawing Sheets

CONDUCTIVE POLYMER COMPOSITE

FIELD OF THE DISCLOSURE

The present disclosure is directed to a conductive polymer composite.

BACKGROUND

Additive manufacturing (also known as three dimensional printing) as practiced in industry has been, to date, mostly concerned with printing structural features. There is a need for materials and processes that integrate functional properties (such as electronic features) into additive manufacturing. Recently, conductive materials that are potentially useful in additive manufacturing have been commercialized, but their conductivities are generally low, ranging from ~$10^{-3}$ S/cm to upwards of ~2.0 S/cm. The mechanical properties of the commercially available materials, particularly the conductive materials such as Acrylonitrile butadiene styrene (ABS) or polylactic acid (PLA), are generally limited (e.g., are not flexible and/or are fairly brittle), which limits use as a conductive component.

There is great interest in the field of additive manufacturing to develop improved materials that can be used to easily print completely integrated functional objects with limited post-assembly. This would allow completely new designs in the manufacturing and consumption of everyday objects, particularly when they can be enabled with conductive materials. The capability of printing conductive components within an object can provide the potential for embedded sensors and electronics.

Common techniques in additive manufacturing utilize the extrusion of molten polymer through a heated nozzle. This method is used in, for example, fused deposition modeling (FDM), where a filament is fed into a hot zone for continuous extrusion. The molten polymer can be deposited layer by layer onto a build plate in order to form 3D objects. There are very few filament materials currently on the market which exhibit electrical conductivity, and those which are available have relatively low conductivities, which limits the range of potential applications. The materials are typically constructed such that one conductive material forms a percolating network through an insulating polymer base, such that electrons have a continuous pathway to flow. The formation of this conductive network is limited to the way the conductive particles are arranged within the polymer base. Although these materials have been extensively explored in both academia and industry, the focus is typically on minimizing the amount of conductive additive required to form a percolating network, where the conductivity is relatively low. One example of a paper directed to the study of electrical percolation is Yao Sun et al., Modeling of the Electrical Percolation of Mixed Carbon Fillers in Polymer-Based Composites, Macromolecules 2009, 42, 459-463, which describes the use of multi-walled carbon nanotubes and either carbon black or graphite to lower percolation thresholds for polymer composites. This paper does not describe techniques for increasing conductivity substantially beyond the percolation threshold. Nor does it discuss the use of conductive polymers for additive manufacturing.

Novel plastic composite materials that exhibit increased conductivity would be a welcome step forward in the art, and could have significant impacts in the field of additive manufacturing.

SUMMARY

An embodiment of the present disclosure is directed to a conductive polymer composite, comprising: a thermoplastic polymer; a plurality of carbon nanotubes; and a plurality of metallic particulates in an amount ranging from about 0.5% to about 80% by weight, relative to the total weight of the conductive polymer composite.

Another embodiment of the present disclosure is directed to a method of three dimensional printing, comprising: providing a composite to a three-dimensional printer; heating the composite; and extruding the heated composite onto a build platform to form a three dimensional object, wherein the composite comprises a thermoplastic polymer, carbon nanotubes in an amount ranging from 2% to about 40% by weight relative to the total weight of the conductive polymer composite, and a plurality of metallic particulates in an amount ranging from about 0.5% to about 80% by weight relative to the total weight of the conductive polymer composite Another embodiment of the present disclosure is directed to a conductive polymer composite filament, comprising: a thermoplastic polymer; carbon nanotubes in an amount ranging from 2% to about 40% by weight, relative to the total weight of the conductive polymer composite; and a plurality of metallic particulates in an amount ranging from about 0.5% to about 80% by weight, relative to the total weight of the conductive polymer composite.

The compositions of the present application exhibit one or more of the following advantages: improved conductivity of filaments for 3D printing applications, such as fused deposition modeling (FDM); an unexpected, synergistic increase in electrical conductivity when metallic fillers are added to multi-walled carbon nanotube/polymer composites; or an improved method for increasing the electrical conductivity in polymer composites while retaining material properties suitable for additive manufacturing.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1:
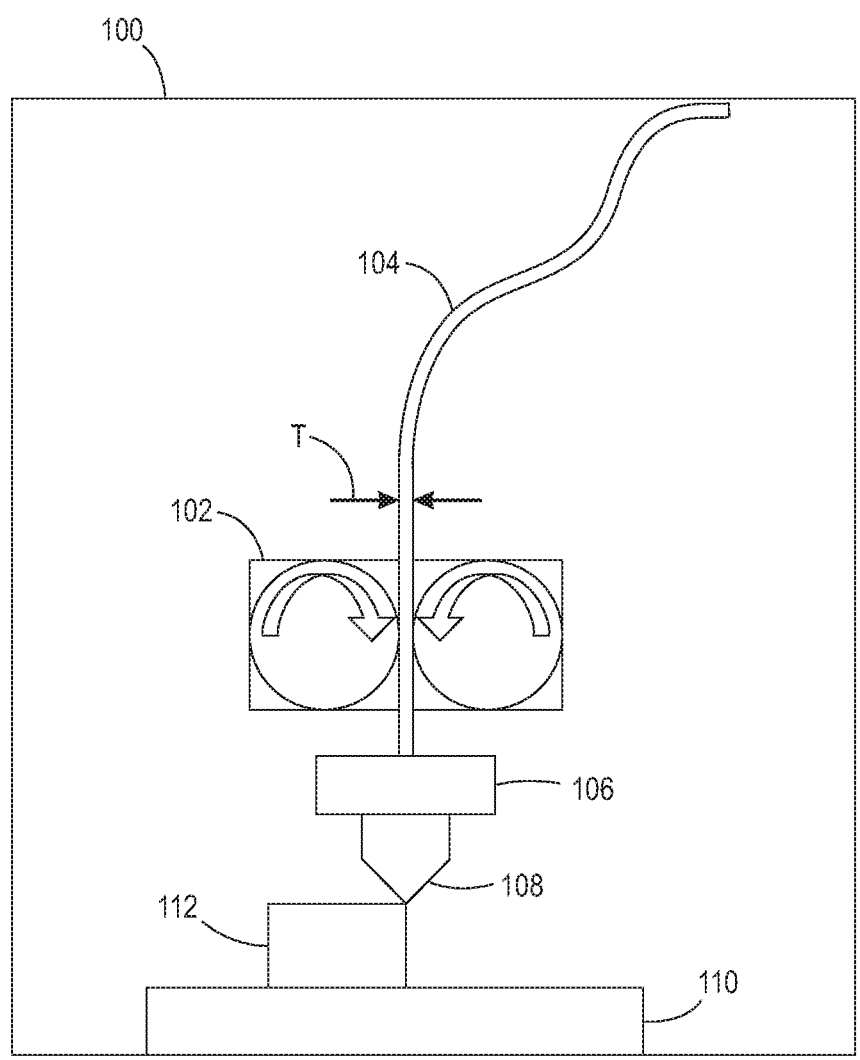
FIG. 1 illustrates a three-dimensional printer employing a filament made with the compositions of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

An embodiment of the present disclosure is directed to a conductive polymer composite. The composite comprises a thermoplastic polymer, carbon nanotubes and a plurality of metallic particulates in an amount ranging from about 0.5% to about 30% by weight, relative to the total weight of the conductive polymer composite Thermoplastic Polymer Any suitable thermoplastic polymer useful in three dimensional printing can be employed in the composites of the present disclosure. The composite can include a single polymer or mixtures of thermoplastic polymers, including mixtures of any of the thermoplastic polymers disclosed herein. In an embodiment, the thermoplastic polymer comprises at least one repeating unit selected from the group consisting of acrylate units, carboxylic acid ester units, amide units, lactic acid units, benzimidazole units, carbonate ester units, ether units, sulfone units, arylketone units, arylether units, etherimide units, ethylene units, phenylene oxide units, propylene units, styrene units, vinyl halide units and carbamate units. In an embodiment, the thermoplastic polymer is a copolymer, such as a block copolymer, of two or more of any of the above listed repeating units. As an example, the thermoplastic polymer can comprise at least one polymer selected from the group consisting of polyacrylates, polybenzimidazoles, polycarbonates, polyether sulfones, polyaryl ether ketones such as polyether ether ketone, polyetherimide, polyethylenes such as polyethylene and poly(ethylene-co-vinylacetate), polyphenylene oxides, polypropylenes such as polypropylene and Poly(vinylidene fluoride-co-hexafluoropropylene), polystyrenes such as polystyrene, poly(styrene isoprene styrene), acrylonitrile butadiene styrene (ABS) and poly(Styrene Ethylene Butylene Styrene) (SEBS), polyesters such as polyethylene terephthalate, polylactic acid (PLA) and polycaprolactone, polyurethanes, polyamides such as nylon, Poly(vinylidene fluoride) (PVDF) and polyvinyl chlorides. In an embodiment, the thermoplastic polymer does not include Acrylonitrile butadiene styrene (ABS) or PLA.

In an embodiment, the thermoplastic polymer is a selected from the group consisting of polyacrylates and copolymer of acrylates, such as block copolymers of acrylates. The acrylate copolymers can comprise at least one acrylate monomer and optionally one or more additional monomers such as any of those monomers listed above for use in the thermoplastic polymers. Such polymers can be formulated to have a desired degree of flexibility. In an embodiment, the polymer can be a polyester, such as polycaprolactone.

The thermoplastic polymer can be included in the composite in any suitable amount that will allow the composite to function in a three dimensional printing process. Examples of suitable amounts include a range of from about 10% to about 90% by weight, such as about 40% to about 70%, or about 40% to about 60%, relative to the total weight of the conductive polymer composite. The composite can include carbon nanotubes and a plurality of metallic particulates in any suitable amount that will provide the desired conductivity.

Carbon Nanotubes

Any suitable carbon nanotubes can be employed in the embodiments. Examples of suitable carbon nanotubes include single walled carbon nanotubes, multi-walled carbon nanotubes and mixtures thereof. In an embodiment, the carbon nanotubes are multi-walled carbon nanotubes. Commercially available sources of carbon nanotubes include, for example, carbon nanotubes available from CHEAPTUBES™ or NANOCYL™, such as Nanocyl 7000.

Example amounts of carbon nanotubes include a range of from 2% to about 40% by weight, such as about 5% to about 20% or about 5% to about 15%, relative to the total weight of the conductive polymer composite. Larger amounts of carbon nanotubes may reduce processability of the composition by a 3D printer, depending, on among other things, the type of thermoplastic and the printing process employed. Thus, in an embodiment, carbon nanotube concentrations of 20% by weight or less, such as 10% by weight or less, may be preferred.

Metallic Particulate

The term "metallic particulate" is defined herein to include metal additives in the form of metal wires, fibers, flakes and particles.

Any suitable metallic particulates can be employed in the composites of the present disclosure. The metallic particulates can be selected from one or more forms such as metallic flakes, metallic particles, metallic wires and mixtures of metallic flakes, metallic particles and metallic wires. The plurality of metallic particulate may comprise particulates that are defined by at least one dimension, for example, a diameter, that may be in a range of from about 50 nm to about 5 μm. In some embodiments the metal particulates may have one of its dimensions in a range of less than or equal to about 100 nm. Therefore, the plurality of metallic particulates may comprise a plurality of metal particulates comprising nanoparticulates and/or micron-scale particulates. For example, the plurality metallic particulates may comprise metal additives in the form of a plurality of metal wires, including nanowires and/or micron-scale wires; a plurality of flakes, including nanoflakes and/or micron-scale flakes; and/or a plurality of particles, including nanoparticles and/or micron-scale particles. In an example, the metal wires may have an aspect ratio that is higher than an aspect ratio of the metal flakes, and the metal flakes may have an aspect ratio that is higher than an aspect ratio of the metal particles.

For the metal particulates, any suitable metal additive useful in three-dimensional printing can be employed in the composites of the present disclosure. The metal may be selected from any metal and may include metal alloys. Any suitable metal can be employed, for example, in particular form. Examples of suitable metals include Bi, Sn, Sb, Pb, Ag, In, Cu, or alloys thereof. For example, alloys may include at least one of the following, BiSnPb, BiSn, BiSnAg, SbPbBi, SnBi, InSn, SnInAg, SnAgCu, SnAg, SnCu, SnSb, SnAgSb, or mixtures thereof.

Example amounts of metallic particulates include a range of from about 0.5% to about 80% by weight, about 0.5% to about 75% by weight, about 0.5% to about 65% by weight, about 0.5% to about 60% by weight, about 5% to about 45% by weight, or about 10% to about 40% by weight, or about 15% to about 35% by weight, or about 20% to about 30% by weight, relative to the total weight of the conductive polymer composite. In one embodiment, the metallic particulates include a range of from about 0.5% to about 30% by weight, relative to the total weight of the conductive polymer composite. While not limited to any particular theory, it is believed that the plurality of metallic particulates do not form percolating networks in the conductive polymer composite but contribute to an existing percolating network formed by carbon nanotubes of the conductive composite.

The conductive polymer composites of the present disclosure can include any other suitable optional ingredients in any desired amounts, such as carrier liquids, plasticizers, dispersants and surfactants. Alternatively, ingredients not expressly recited in the present disclosure can be limited and/or excluded from the conductive polymer composites disclosed herein. Thus, the amounts of the thermoplastic polymer, carbon nanotubes and metallic particulates, with or without any optional ingredients as recited herein such as carrier liquids, plasticizers, dispersants and/or surfactants, can add up to 90% to 100% by weight of the total ingredients employed in the composites of the present disclosure, such as 95% to 100% by weight, or 98% to 100% by weight, or 99% to 100% by weight, or 100% by weight of the total ingredients.

The composite of the present disclosure can be in any suitable form. In an embodiment, the composite is a conductive paste. The paste can be a paste at room temperature or a material that needs to be heated in order to flow like a paste. In an embodiment, the paste comprises at least one carrier liquid. In an embodiment, the carrier liquid may be a solvent capable of dissolving one or more of the paste ingredients. In another embodiment, the carrier liquid is not a solvent. Suitable carrier liquids for the paste include, for example, toluene, pyrrolidones (e.g. N-methylpyrrolidone, 1-cyclohexyl-2-pyrrolidone), N,N-dimethylformamide (DMF), N,N-dimethylacetamide dimethylsulfoxide and hexamethylphosphoramide The carrier liquid can be included in the paste in any suitable amount, such as, for example, about 0.5% to about 60% weight percent based on the total weight of the wet composite paste. Optional additives that can be included in the paste are, for example, dispersants, surfactants, other solvents in addition to the carrier liquid and other conductive additives.

In an alternative embodiment, the composite can be in the form of a dry composite having less than 5% liquid carrier, such as less than 3%, 2% or 1% liquid carrier by weight relative to the total weight of the dry composite, such as no liquid carrier. The dry composite can be formed using solvent, which is then removed by any suitable method, such as by heating, vacuum and/or other liquid removal techniques. Alternatively, the composite can be made without carrier liquid using neat processing techniques.

The composite has a bulk conductivity greater than 1 S/cm, such as greater than 3 S/cm, such as greater than 3.5 S/cm or greater than 4 S/cm. Bulk conductivity is calculated using the formula, $$\sigma = L/(R*A) \quad (1)$$

Where:
σ is bulk electrical conductivity;
L is length of the filament;
R is measured resistance of an extruded filament;
A is the cross-sectional area ($\pi r^2$) of the filament, where r is the radius of the filament.

The resistance, R, can be measured by forming an extruded filament made from the composite. The tips of the filament are painted with silver to provide good electrical connections with the testing equipment (e.g., a digital multimeter), but would not necessarily be painted if the filaments were to be used in additive manufacturing. Resistance can then be measured across the length of the filament. The dimensions of the filament and the measured value for R can then be used to calculate bulk conductivity (σ) of the composite.

The composites of the present disclosure can be made by any suitable method. For example, the thermoplastic polymer can be combined with the carbon nanotubes and at least one metallic additive using melt mixing techniques. Other suitable techniques for mixing such compositions are well known in the art.

The present disclosure is also directed to a method of three dimensional printing. Any type of three dimensional printing can be employed, such as filament printing (e.g., FDM) or paste extrusion. The method includes providing any of the conductive polymer composites of the present disclosure to a three dimensional printer. The composite can be in any suitable form useful in three dimensional printing, such as a filament or paste. The conductive polymer can be heated to a molten state suitable for extrusion. Then the heated conductive polymer is extruded onto a substrate to form a three dimensional object.

The conductive polymer composites of the present disclosure can be used in a FDM process by first forming the composite into a filament having a desired shape and dimensions (e.g., by extrusion or any other suitable process). The filament can have any suitable shape that will allow the filament to be loaded into a 3D FDM printer and printed. The filament, as initially supplied, can have a continuous length that is much longer than its thickness, T, (shown in FIG. 1) such as a ratio of length to thickness that is greater than 100 to 1, such as greater than 500 to 1 or 1000 to 1 or more, where T is the smallest thickness dimension of the filament (e.g., the diameter if the filament has a circular cross-section). Any suitable thickness can be used, and may depend on the 3D printer being used. As an example, thicknesses can range from about 0.1 mm to about 10 mm, such as about 0.5 mm to about 5 mm, or about 1 mm to about 3 mm.

An example of a three dimensional printer 100 employing a filament of the present disclosure is shown in FIG. 1. The three dimensional printer 100 includes a feeder mechanism 102 for supplying the filament 104 to a liquifier 106. The liquifier 106 melts the filament 104 and the resulting molten plastic is extruded through a nozzle 108 and deposited as an article 112 on a build platform 110. The article 112, therefore, comprises the same composition as the filament as described above, including: the thermoplastic polymer; the plurality of carbon nanotubes; and the plurality of metallic particulates, and the metallic particulates contribute an existing percolating network formed by the carbon nanotubes and the metallic particulates may not themselves form a separate percolating network. The feeder mechanism 102 can comprise rollers or any other suitable mechanism capable of supplying the filament 104 from, for example, a spool of filament (not shown). The liquifier 106 can employ any technique for heating the filament, such as heating elements, lasers and so forth. The three dimensional printer 100 as shown in FIG. 1 is exemplary only and any type of three dimensional printer can be employed to deposit the filaments of the present disclosure.

EXAMPLES

Example 1

Conductive polymer composites were prepared by melt mixing a polymer base (Polycaprolactone; "PCL") with 10% by weight of multi-walled carbon nanotubes (MWNT) and 30% by weight silver (Ag) flakes on a Haake twin-screw extruder for 30 minutes at 30 rpm. The resulting material was cryogenically ground and the ground composite was extruded into a filament using a Melt Flow Indexer (MFI) and a modified die. The conditions for extrusion on the MFI included a 1.8 mm orifice and 16.96 kg weight in order to prepare final filament. The final filament had a diameter of about 1.75 mm.

Example 2

10 cm section of the extruded filament of Example 1, with ends painted in silver paint, were used to measure resistance in order to calculate bulk conductivity. Resistance measurements were completed using a digital multimeter. Bulk conductivity was calculated using formula 1 above.

Comparative Example A

A composite similar to that of Example 1 was made, but without the silver flakes.

Comparative Example B

A composite similar to that of Example 1 was made, but without the multi-walled carbon nanotubes and using 65% by weight silver flakes.

Example 3

A composite similar to that of Example 1 was made, but with 30% by weight BiSnAg alloy particles instead of the silver flakes.

Comparative Example C

A composite similar to that of Example 3 was made, but without the multi-walled carbon nanotubes and using 75% by weight BiSnAg particles.

Example 4

A composite similar to that of Example 1 was made, but with 26% by weight copper wire instead of the silver flakes.

Comparative Example D

A composite similar to that of Example 4 was made, but without multi-walled carbon nanotubes and using 53% by weight copper wire.

Example 5

A composite similar to that of Example 1 was made, but with 30% by weight tungsten wire instead of the silver flakes.

Comparative Example E

A composite similar to that of Example 5 was made, but without multi-walled carbon nanotubes and using 37.5% by weight tungsten wire.

Example 6

A composite similar to that of Example 1 was made, but with 5% MWNT and 30% by weight copper fiber instead of the silver flakes.

Example 7

A composite similar to that of Example 1 was made, but with 6% MWNT and 55% by weight copper fiber instead of the silver flakes.

Comparative Example F

A composite similar to that of Examples 1 and 6 was made, but without the silver flakes and without the copper fiber.

Example 8

A composite similar to that of Example 1 was made, but with 5% MWNT and 60% by weight copper of the silver flakes.

Bulk conductivity was measured for each of the examples and comparative examples above in a manner similar to that described for Example 2. Results are shown in FIGS. 2-4.

It is noted that the 10% by weight MWNT carbon nanotube concentrations in Comparative Example A resulted in a conductivity of 0.51 S/cm and the 5% by weight MWNT carbon nanotube concentration in Comparative Example F resulted in a conductivity of 0.56 S/cm, which is well above the percolation threshold and is a significantly higher conductivity than any material or combination thereof known for hot extrusion additive manufacturing. Thus, as in some of the other examples, the metallic additives were added to a MWNT-polymer system that has already reached its percolation threshold.

Figure 2:
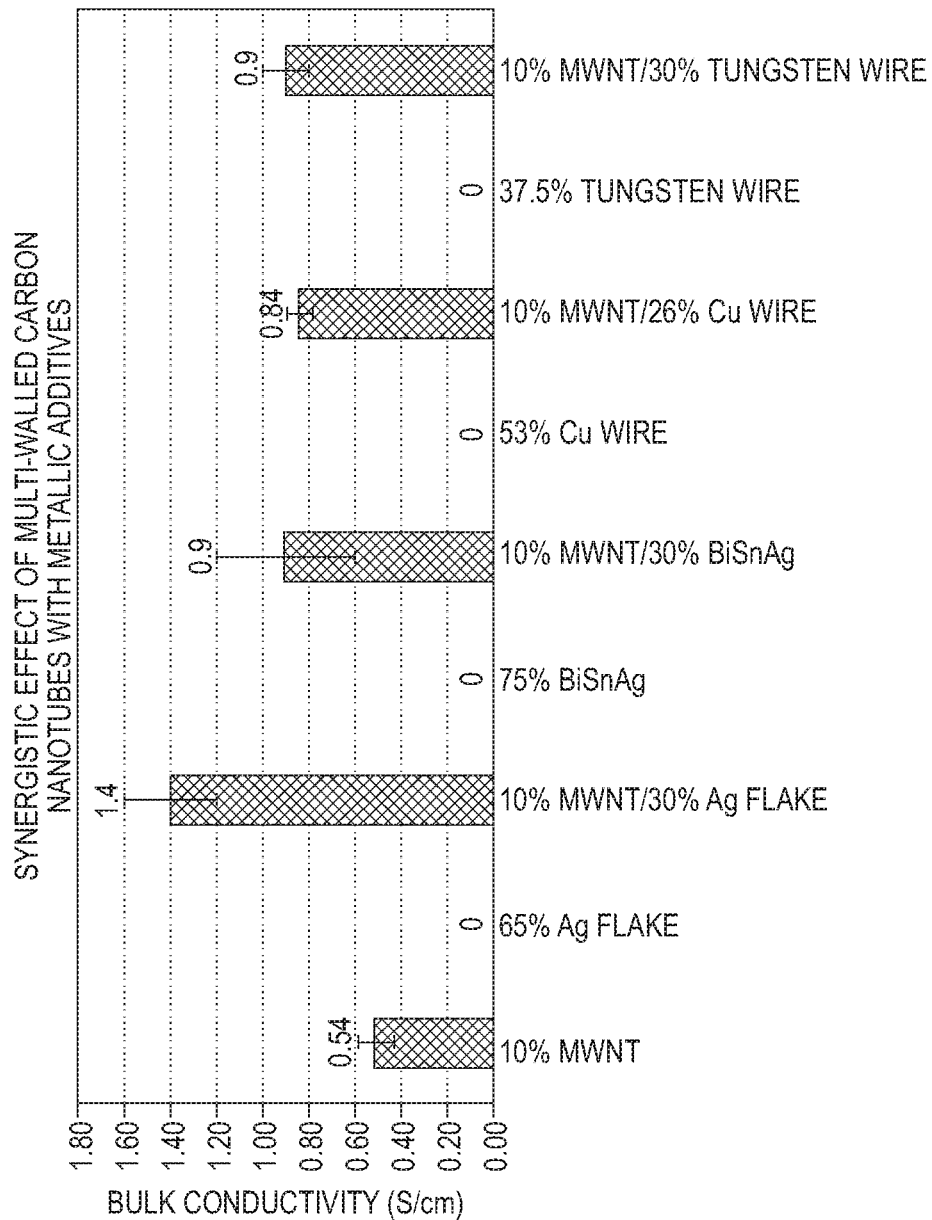
FIGS. 2-4 show a synergistic effect on conductivity of conductive polymer composites comprising multi-walled carbon nanotubes and metallic additives in a thermoplastic polymer base (polycaprolactone), according to an example of the present disclosure. The percentages of carbon nanotubes and metallic additives are shown in wt % relative to a total weight of the conductive polymer composite.
Figure 4:
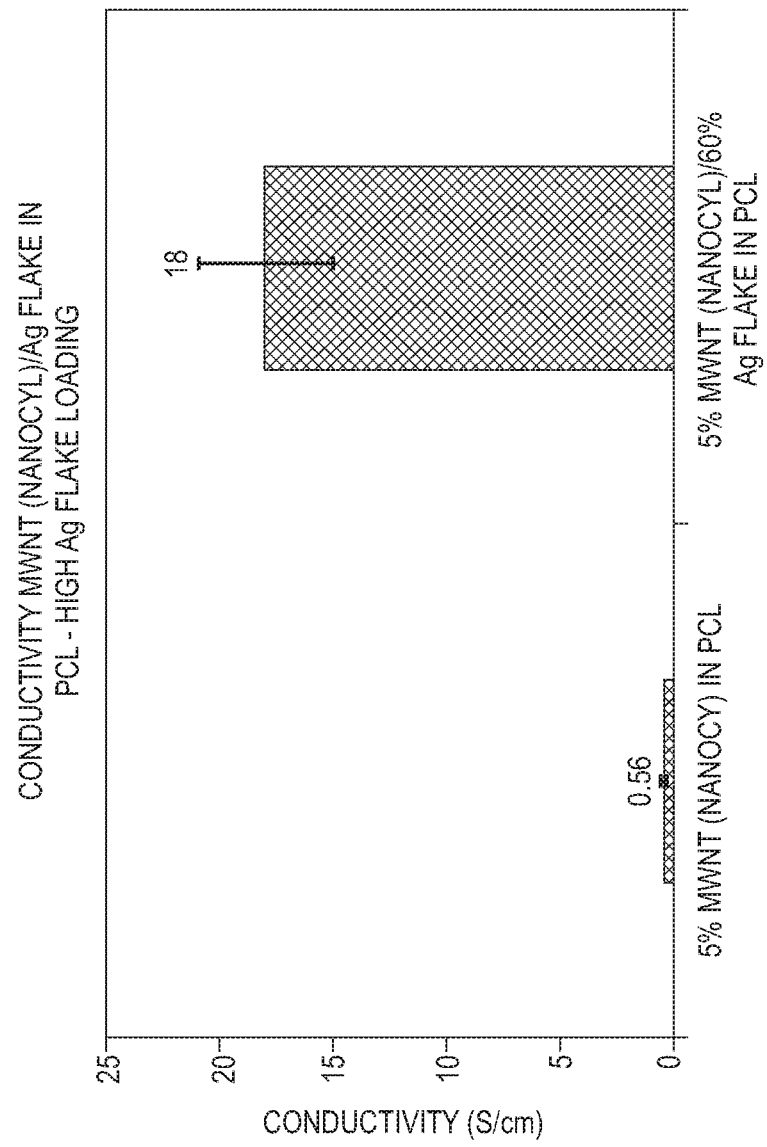

From the results for silver flakes in FIGS. 2 and 4, it is evident that the combination of MWNT and silver flakes had a synergistic effect when combined with one another in a plastic composite, since the combination had a much higher conductivity than each of the components on their own. The results for BiSnAg alloy particles with the MWNT in the plastic composite, such as that for Example 3, show a similar synergistic effect in FIG. 2, as did the results for copper wire and tungsten wire in the MWNT/plastic composite such as in Examples 4 and 5, respectively, as well as the results for copper fiber in Examples 6 and 7. With 30% silver flakes/10% MWNT loading, the conductivity was significantly higher compared with the MWNT alone. With 60% silver flakes/5% MWNT loading, the conductivity was even higher. Such a large increase in conductivity would not have been expected.

Figure 3:
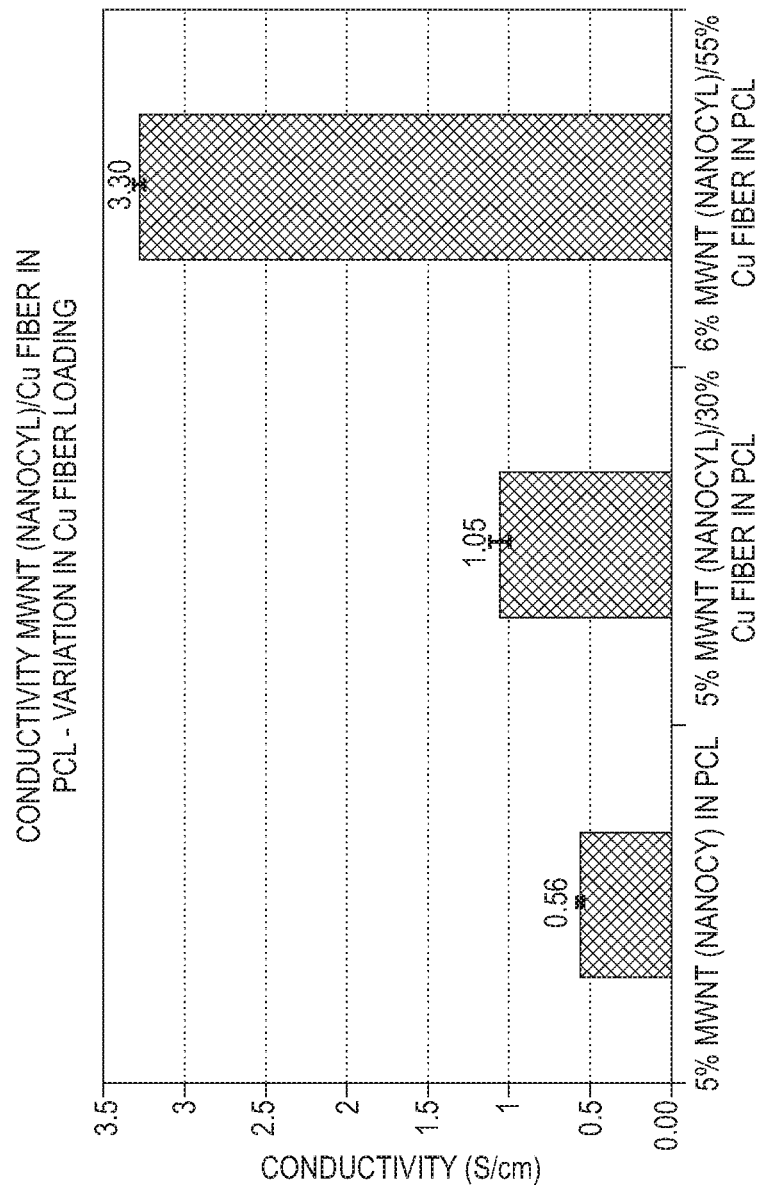

It was not expected that a synergistic increase in conductivity would occur for the Example compositions of FIGS. 2-4 for several reasons. The metallic particulates on their own in a plastic composite (i.e., without the MWNTs), such as in the comparative examples, have significantly lower, such as about zero, conductivity. Also, it was not evident that the increase in metallic additive loading would result in such a drastic increase in conductivity at the carbon nanotube concentrations employed.

Thus, the data of FIGS. 2-4 demonstrate that an unexpected nonlinear increase in conductivity was observed upon addition of at least one metallic additive, which evidences a synergistic effect of the combination carbon nanotubes and metallic additives at relatively high loadings. The synergistic increase in electrical conductivity is unexpected because the selected ones of the at least one metallic additive do not form percolating networks with loadings as high as 35-50 wt %. These metallic additives do, however, contribute to the existing percolating network formed by the carbon nanotubes. This synergistic increase provides an additional advantage in the case of additive manufacturing because increasing the loading of a single particle would not be an effective method for increasing the conductivity. In the case of MWNT, for example, a maximum loading of about 20% by weight is reached where the composite it no longer processable for additive manufacturing. At this loading the melt flow temperature exceeds the capabilities of current technologies. In addition, the composites with metallic additives alone (i.e., no MWNTs) exhibit near-zero conductivity as compared to the conductivity of the composite with MWNTs alone (i.e., no metallic additive). Only the combination of MWNTs with metallic additives demonstrates a nonlinear increase in electrical conductivity in the composite material, while retaining the processability desired for additive manufacturing technologies.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A conductive polymer composite, comprising:
a thermoplastic polymer;
a plurality of multi-walled carbon nanotubes; and
a plurality of metallic particulates in an amount ranging from about 55% to about 80% by weight, relative to the total weight of the conductive polymer composite,
wherein the multi-walled carbon nanotubes are in an amount of at least 5% to about 20% by weight, relative to the total weight of the conductive polymer composite.

2. The composite of claim 1, wherein the thermoplastic polymer comprises at least one repeating unit selected from the group consisting of acrylate units, carboxylic acid ester units, amide units, lactic acid units, benzimidazole units, carbonate ester units, ether units, sulfone units, arylketone units, arylether units, arylalkyl units, etherimide units, ethylene units, phenylene oxide units, propylene units, styrene units, vinyl halide units and carbamate units.

3. The composite of claim 2, wherein the thermoplastic polymer is a copolymer of two or more of the repeating units.

4. The composite of claim 3, wherein the copolymer comprises one or more acrylate units.

5. The composite of claim 1, wherein the thermoplastic polymer comprises at least one polymer selected from the group consisting of polyacrylates, polybenzimidazoles, polycarbonates, polyether sulfones, polyaryl ether ketones, polyethylenes, polyphenylene oxides, polypropylenes, polystyrenes, polyesters, polyurethanes, polyamides, poly(vinylidene fluoride) (PVDF) and polyvinyl chlorides, polyether ether ketone, poly(ethylene-co-vinylacetate), polyetherimide, polypropylene, Poly(vinylidene fluoride-co-hexafluoropropylene), poly(styrene isoprene styrene), acrylonitrile butadiene styrene (ABS), poly(Styrene Ethylene Butylene Styrene) (SEBS), polyethylene terephthalate, polylactic acid (PLA), polycaprolactone and nylon.

6. The composite of claim 1, wherein the thermoplastic polymer is in an amount ranging from about 10% to about 90% by weight, relative to the total weight of the conductive polymer composite.

7. The composite of claim 1, wherein the plurality of metallic particulates comprise one or more form selected from the group consisting of flakes, particles and wires.

8. The composite of claim 7, wherein the particles comprise nanoparticles.

9. The composite of claim 7, wherein the wires comprise nanowires.

10. The composite of claim 7, wherein the flakes comprise nanoflakes.

11. The composite of claim 1, wherein the plurality of metallic particulates comprise silver flakes.

12. The composite of claim 1, wherein the plurality of metallic particulates comprise BiSnAg particles.

13. The composite of claim 1, wherein the plurality of metallic particulates comprise a dimension in the range of about 50 nm to about 5 µm.

14. The composite of claim 1, wherein the composite has a bulk conductivity greater than 1 S/cm, where the conductivity is calculated using the formula $\sigma=L/(R*A)$, based on the measured resistance (R) of an extruded filament made from the composite and having silver painted tips, the filament having a length (L) of 10 cm and a diameter of 1.75 mm.

15. A method of three dimensional printing, the method comprising:
providing a composite to a three-dimensional printer, the composite comprising a thermoplastic polymer, carbon nanotubes in an amount of at least 5% to about 20% by weight, relative to the total weight of the conductive polymer composite, and a plurality of metallic particulates in an amount ranging from about 55% to about 80% by weight relative to the total weight of the conductive polymer composite;
heating the composite; and
extruding the heated composite onto a build platform to form a three dimensional object.

16. The method of claim 15, wherein the heated composite is in the form of a filament.

17. A conductive polymer composite filament, comprising:
a thermoplastic polymer; a plurality of multi-walled carbon nanotubes in an amount of at least 5% to about 20% by weight, relative to the total weight of the conductive polymer composite; and a plurality of metallic particulates in an amount ranging from about 55% to about 80% by weight, relative to the total weight of the conductive polymer composite.

18. The conductive polymer composite filament of claim 17, wherein the at least plurality of metallic particulates comprise one or more form selected from the group consisting of flakes, particles and wires.

19. The conductive polymer composite filament of claim 17, wherein the plurality of metallic particulates are silver or copper particulates and wherein the multi-walled carbon nanotubes are in an amount ranging from 5% to 6%.

* * * * *